United States Patent [19]

Moore

[11] 4,001,918

[45] Jan. 11, 1977

[54] GUARD RETAINER
[75] Inventor: Jimmy E. Moore, Fort Worth, Tex.
[73] Assignee: Stratoflex, Inc., Fort Worth, Tex.
[22] Filed: Dec. 9, 1974
[21] Appl. No.: 530,952
[52] U.S. Cl. .............................. 24/16 R; 138/110; 285/114
[51] Int. Cl.² .................. F16L 11/00; A44B 21/00
[58] Field of Search ............... 138/110; 285/114; 24/16 R, 20 W, 23 W, 11 C, 11 F, 73 HH, 73 HL, 11 CT; 5/259 B, 259 R

[56] References Cited
UNITED STATES PATENTS

| | | | |
|---|---|---|---|
| 699,298 | 5/1902 | Eyster | 5/269 B X |
| 742,117 | 10/1903 | Hoefer | 5/259 R X |
| 880,060 | 2/1908 | Wood | 285/114 |
| 1,101,844 | 6/1914 | Gething | 285/114 |
| 1,504,945 | 8/1924 | Dempsey et al. | 285/114 |
| 2,185,741 | 1/1940 | Sorg et al. | 138/110 |
| 3,197,240 | 7/1965 | Lindberg | 285/114 |
| 3,309,824 | 3/1967 | Barrett | 24/20 W |

Primary Examiner—Donald A. Griffin
Attorney, Agent, or Firm—Hibben, Noyes & Bicknell, Ltd.

[57] ABSTRACT

This disclosure deals with apparatus for holding in place a coiled spring guard on a tubular member such as a hose, tubing or fitting. The apparatus includes a clip which is fastened to one end of the guard and a clamp which encircles the tubular member and the clip and holds the clip in place on the member. The clip has a hook formed at one end thereof, which hooks under a coil or loop of the spring guard, the hooked coil being displaced from the endmost coil of the guard. The center portion of the clip extends over the top of the endmost coils, and the opposite end of the clip is fastened to the hose by a clamp. The clip may be shaped to fit a spring guard made from circular cross-sectional wire or from flat cross-sectional wire.

13 Claims, 6 Drawing Figures

U.S. Patent  Jan. 11, 1977  4,001,918
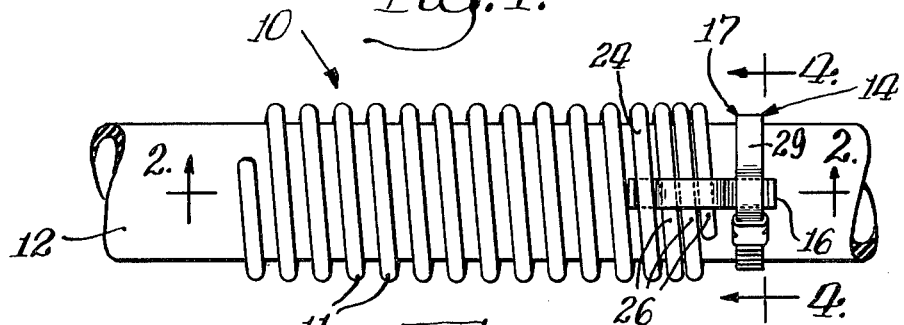
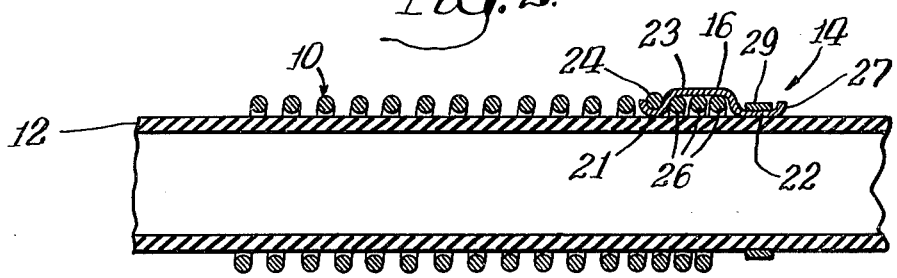
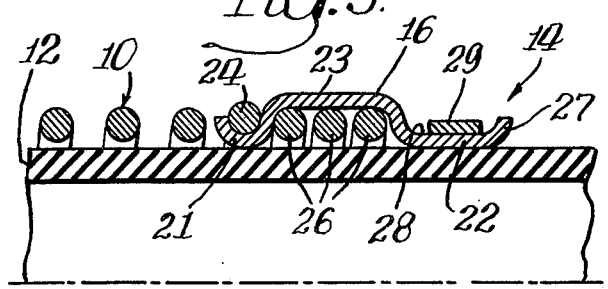
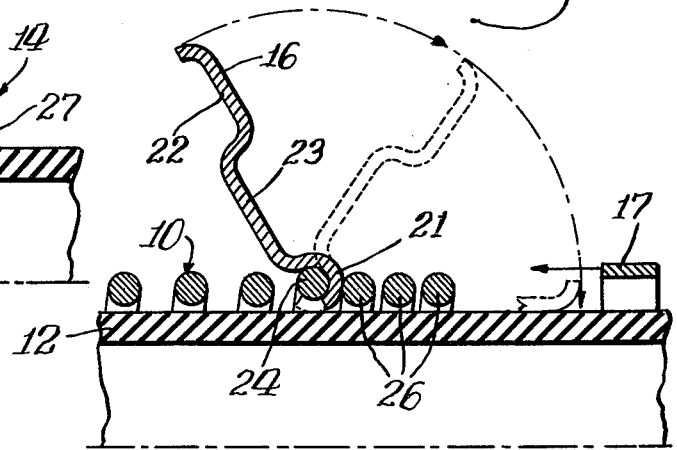
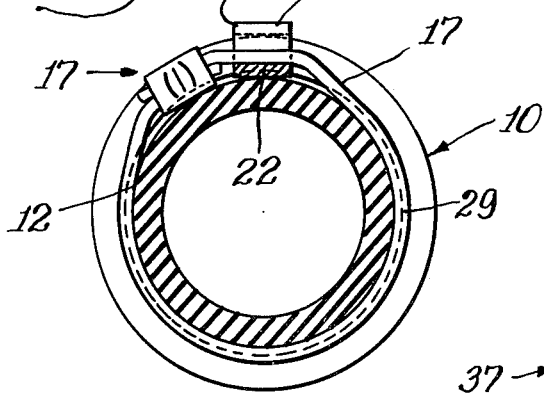
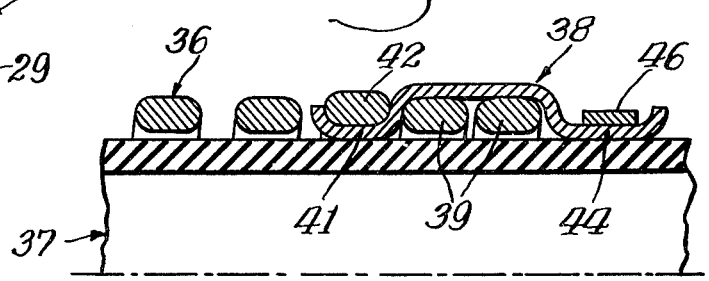

GUARD RETAINER

Hose guards are commonly used to protect tubular members such as hose and tubing. An external guard may be positioned, for example, at a location on a hose where chafing is expected, or close to a fitting to prevent excessive bending of a hose adjacent the fitting. Such guards are commonly made of helically coiled wire having a circular cross section or a flat, generally rectangular cross section.

It is of course necessary to fasten such an external guard in place in order to hold it at a desired location on the hose, and a variety of guard retainer designs have been provided for this purpose. A disadvantage of some prior art retainers is that a different size retainer must be provided for each size hose or guard wire size, while other prior art clamps are deficient because they are excessively expensive or complex.

It is a general object of the present invention to provide an improved guard retainer which securely holds a spring guard in place, is usable with a variety of tubular member and guard wire sizes, and may be inexpensively manufactured.

A retainer in accordance with the present invention, for a coiled spring guard which is positioned around a tubular member, comprises a clip having a hook portion at one end thereof and a clamp engagable portion at the other end thereof. The hook portion is adapted to be hooked under a selected coil or loop of the guard, the selected coil being displaced from one end of the guard. The center portion of the clip extends over the endmost coils of the guard, and the clamp engagable portion extends beyond the end of the guard. A clamp is positioned on the clamp engagable portion and the tubular member, and secures them together, thus preventing relative movement of the member, the clip and the guard.

The foregoing and other objects and advantages of the present invention will be better understood from the following detailed description taken in conjunction with the accompanying figures of the drawing, wherein:

FIG. 1 is an elevational view of apparatus including a retainer in accordance with the present invention;

FIG. 2 is a sectional view taken on the line 2—2 of FIG. 1;

FIG. 3 is a fragmentary enlarged view of a portion of the structure shown in FIG. 2;

FIG. 4 is an enlarged sectional view taken on the line 4—4 of FIG. 1;

FIG. 5 is a view generally similar to FIG. 3 but illustrating a step in the assembly of the apparatus; and FIG. 6 is a view similar to FIG. 3 but illustrating an alternate form of the invention.

The structure illustrated in FIG. 1 includes a helically coiled spring guard 10 which is formed by a series of coils or loops 11. The spring guard 10 is positioned around a tubular member 12 such as a hose or tube, the member 12 consisting in the present illustration of a length of flexible hose. The structure further includes a retainer 14 for holding the spring guard 10 securely in place on the tubular member 12, the retainer 14 including a guard retainer clip 16 and a band clamp 17.

As best illustrated in FIGS. 2 and 3, the spring guard 10 is made from coiled wire which in the present instance has a circular cross section. The internal diameter of the spring guard 10 is of course sufficiently large relative to the tubular member 12 that it may be slipped over the member 12 and placed at the desired location.

With specific reference to FIGS. 1 to 3, the retainer clip 16 includes, integrally formed, an arcuate hook-shaped portion 21 at one end thereof, a substantially flat clamp engagable portion 22 at the other end thereof, and a raised center portion 23 between the two end portions 21 and 22. The hook-shaped portion 21 has an approximately 180° arc and, when the clip is assembled with the tubular member 12 and the guard 10, the open side of the hook faces outwardly or away from the tubular member 12. As best shown in FIGS. 3 and 5, the portion 21 is hooked underneath a selected coil, indicated by reference numeral 24, of the spring guard 10, the coil 24 being spaced from the adjacent end of the guard 10. The endmost coils, indicated by the reference numeral 26, are in the present instance three in number and of course are between the coil 24 and the end of the guard 10. The raised center portion 23 of the clip 16 extends over the tops or outer surfaces of the three endmost coils 26. The left end, as seen in FIG. 3, of the center portion 23 slopes downwardly and merges with the hook-shaped portion 21, and the right end of the center portion 23 slopes downwardly and merges with the clamp engagable portion 22. The lower or inner surfaces of the portions 21 and 22 fit against or closely adjacent to the outer surface of the tubular member 12, while the center portion 23 of the clip is displaced outwardly and fits over the outer surfaces of the three endmost coils 26. Thus, the portions 21 and 22 are displaced laterally inwardly toward the member 12 from the plane of the center portion 23, and the displacement is approximately equal to the thickness of the wire forming the guard 10. The dimensions of the clip are preferably such that there is a reasonably snug fit between the portions 21 and 22 and the tubular member 12, and between the center portion 23 and the three endmost coils 26. The axial length of the center portion 23, in the embodiment of the invention illustrated in FIGS. 1–4, is slightly longer than the axial dimension of the three endmost coils 26. The downwardly curved ends of the center portion 23 may bear against the outer surfaces of at least some of the coils 26.

The clamp engaging portion 22 of the clip 16 is substantially flat as previously mentioned and preferably engages the outer surface of the tubular member 12, but the right end 27 of the portion 22 is preferably turned outwardly or away from the tubular member 12. The resulting upwardly bowed configuration of the engaging portion 22 forms a recess 28 (FIG. 3) which receives the clamp 17.

In the present instance, the clamp 17 comprises a metal band 29, the ends of which are brought together as illustrated in FIGS. 1 and 4 and securely fastened by means of a member 31 (FIGS. 1 and 4) that is positioned around the overlapped ends of the band 29 and crimped tightly into securing engagement with the ends of the band 29. It will be obvious that other types of clamps could just as readily be used.

The clip 16 is preformed to the shape illustrated in the drawing and is preferably made of a strip of flat metal. The circumferential width of the clip 16, in the present instance, relative to the circumference of the tubular member 12, is such that the clip 16 extends over approximately a 25° arc of the member 12. While the length of the center portion 23 is illustrated as being long enough to extend over the three endmost coils of the guard 10, it should be apparent that the center portion 23 could, if desired, be made longer and thereby extend over a larger number of the endmost coils or it could be made smaller and extend over only one or two of the endmost coils. A particular size clip when used with a large diameter wire guard will extend over a smaller number of endmost coils than will the clip when used with a smaller diameter wire guard.

The clip 16 may be assembled with the spring guard 10 and the tubular member 12 by positioning the hook-shaped portion 21 under the selected coil 24 as illustrated in FIG. 5 with the center portion 23 and the clamp engagable portion 22 extending outwardly or away from the tubular member 12. After the portion 21 has been hooked under the coil 24, the opposite end of the clip is swung clockwise as illustrated by the arrow in FIG. 5 until the clamp engagable portion 22 lies adjacent or flat against the outer surface of the tubular member 12, and then the band clamp 17 is positioned in the recess 28 and secured in place. Alternatively, the parts may be assembled by first fastening the band clamp 17 in place in the recess 28 and fastening the clip 16 in place on the tubular member 12. Thereafter, the end of the spring guard 10 is positioned in the hook-shaped portion 21 and then, by turning the hose guard 10 relative to the clip 16, the endmost coils of the guard may be screwed into the space between the center portion 23 and the outer surface of the member 12.

Regardless of the method of assembly of the parts, once the parts have been assembled the clip 16 is held tightly in place on the tubular member 12 and, in turn, it holds the spring guard 10 firmly in place. The endmost coils 26 are retained in the space below the raised center portion 23, the hook-shaped portion 21 is held down by the coil 24, and the other end of the clip is held down by the band clamp 17. The clip is preferably sized relative to the guard 10 so that there is slight tension between the clip 16 and the coils 24 and 26.

FIG. 6 illustrates an alternate form of the invention, which is designed for use with a coiled spring guard 36 wherein the coils have a flat, somewhat rectangular cross section. The spring guard 36 is positioned around a tubular member 37 which again may be a hose or tube. A clip 38 having a configuration which is substantially the same as the clip 16 is positioned over the two endmost coils 39 of the spring guard 36, and a hook-shaped portion 41 of the clip 38 is positioned under a selected coil 42 of the guard 36, the coil 42 being the third from the end. The shape of the hook-shaped portion 41 is elongated in the axial direction and is substantially flat rather than arcuate as shown in FIG. 3 and conforms to the cross-sectional configuration of the coil 42. Further, the center portion 43 of the clip 38 is sized to fit over the tops of the two endmost coils 39. The clip 39 of course further includes a clamp engagable portion 44 which is fastened to the tubular member 37 as by a band clamp 46, the portion 44 having essentially the same configuration as the portion 22 shown in FIG. 3. The method of assembly, and the manner in which the clip 38 secures the spring guard 36 to the tubular member 37 is the same as described with regard to the retainer illustrated in FIGS. 1–5.

As previously mentioned, a variety of types of clamps may be used to fasten the clip to the tubular member 12, and the clamp engagable portion of the clip may be shaped to accommodate other clamp designs. While the clamp has been shown and described as being attached to member such as a hose or tube, the clamp could be attached to the shank of a fitting or coupling which is secured to the hose or tube.

The present invention resides both in the configuration of the clip and also in the combination of the clip and a clamp for securing the clip in place.

It will be apparent from the foregoing discussion that a clip in accordance with the present invention may be inexpensively manufactured by cutting a flat strip of metal and then deforming it using suitable dies to the proper shape. The clip may be easily fastened to a tubular member such as a hose, tube, fitting or coupling by an inexpensive clamp, and the clip securely holds the spring guard in place. Further, a clip and the associated clamp may readily be used on a variety of sizes of both tubular members and guard wire sizes. The only accommodation required to make the retainer suitable for use with a larger size tubular member is simply to make the clamp larger. Further, a clip may be used with spring guards made of different shapes or sizes of wire. While the clip may be substantially flat, it is preferably slightly arcuate to conform generally to the curvature of the outer surface of the tubular member.

What is claimed is:

1. Apparatus comprising a coiled spring guard for use with a tubular member, said spring guard being adapted to be coiled around said tubular member, a clip comprising a portion at one end thereof fastened to a selected coil of said guard, said selected coil being displaced from an end of said guard, a portion at the other end of said clip positioned beyond the endmost coil of said guard and adapted to be fastened to said tubular member, and a portion between said ends of said clip overlying and extending closely adjacent the endmost coil of said guard.

2. Apparatus as in claim 1, wherein said portion at the other end of said clip is upwardly bowed and thereby forms a recess for receiving a clamp that fastens said clip to said tubular member.

3. A retainer clip for use in fastening a coiled spring guard to a tubular member, said clip comprising a portion at one end thereof adapted to be fastened to a guard coil which is displaced from an end of said guard, the other end portion of said clip being adapted to be positioned beyond the end of said guard and being fastened to said tubular member, and the center portion of said clip between said two end portions being adapted to extend over the endmost coil of said guard, said one end portion having a hook shape and being adapted to be hooked under a guard coil.

4. A clip as in claim 3, wherein said one end portion has an arcuate hook shape and is adapted for use with a spring guard made from a circular cross section wire.

5. A clip as in claim 3, wherein said one end portion has a substantially flat hook shape and is adapted for use with a spring guard made from a flat, generally rectangular cross section wire.

6. A retainer clip for use in fastening a coiled spring guard to a tubular member, said clip comprising a portion at one end thereof adapted to be fastened to a guard coil which is displaced from an end of said guard, the other end portion of said clip being adapted to be positioned beyond the end of said guard and being fastened to said tubular member, and the center portion of said clip between said two end portions being adapted to extend over the endmost coil of said guard, said center portion being at least as long as the combined width of two or more of said endmost coils and extending over said endmost coils.

7. A retainer clip for use in fastening a coiled spring guard to a tubular member, said clip comprising a center portion, a hook-shaped portion at one end of said center portion and a clamp engagable portion at the other end of said center portion, both said hook-shaped portion and said clamp engagable portion being displaced laterally in one direction from the plane of said center portion, said lateral displacement being by an amount which is approximately equal to the thickness of said spring guard, and the opening of said hook-shaped portion facing in the opposite direction.

8. A retainer clip as in claim 7, wherein said clip extends over approximately a 25° arc of said tubular member.

9. A retainer clip as in claim 7, wherein said center portion is elongated in the direction of the axis of said tubular member and extends over at least two coils of said guard.

10. A retainer for fastening a coiled spring guard to a tubular member, comprising a clip having a hook portion at one end thereof, said hook portion being adapted to be hooked underneath a selected guard coil which is displaced from an end of said guard, said clip further including a raised center portion which is adapted to extend over the endmost coils of said guard, and means for fastening the other end of said clip to said tubular member.

11. A retainer as in claim 10, wherein said fastening means comprises a band clamp.

12. A retainer as in claim 11, wherein said other end of said clip is outwardly bowed and receives said band clamp.

13. A retainer as in claim 10, wherein said clip is arcuate and conforms generally to the curvature of the outer surface of said tubular member.

* * * * *